United States Patent [19]

Hess et al.

[11] 3,949,045

[45] Apr. 6, 1976

[54] EXTRUDED PIPE COUPLING AND METHOD AND APPARATUS FOR FORMING

[76] Inventors: William L. Hess, 1327 Plaza De Sonadores, Santa Barbara, Calif. 93108; Michael B. Steffora, 1507 Live Oak Lane, Santa Barbara, Calif. 93105

[22] Filed: Feb. 22, 1974

[21] Appl. No.: 444,745

[52] U.S. Cl. ............... 264/296; 264/150; 264/318; 264/322; 264/331; 264/345
[51] Int. Cl.² ................. B29C 17/00; B29D 23/00
[58] Field of Search ........... 264/150, 209, 210, 320, 264/322, 294, 296, 150, 151, 318, 345, 331; 72/58, 62

[56] References Cited
UNITED STATES PATENTS

| | | | |
|---|---|---|---|
| 3,149,861 | 9/1964 | Larsson | 285/349 |
| 3,214,505 | 10/1965 | Pierkowski et al. | 264/294 |
| 3,264,383 | 8/1966 | Niessen et al. | 264/150 |
| 3,432,887 | 3/1969 | Poux et al. | 425/387 |
| 3,557,278 | 1/1971 | Kuhlemann | 264/322 |
| 3,632,732 | 1/1972 | Osterhagen et al. | 264/322 |
| 3,706,519 | 12/1972 | Soethje | 264/322 |
| 3,755,528 | 8/1973 | Gütlhuber | 264/322 |

FOREIGN PATENTS OR APPLICATIONS 997,552  7/1965  United Kingdom............... 264/296

*Primary Examiner*—Willard E. Hoag
*Attorney, Agent, or Firm*—Harry W. Brelsford

[57] ABSTRACT

A plastic pipe coupling is formed by a pressing operation upon a section of extruded pipe that has been heat softened. The method of forming includes enclosure of the entire pipe section in a mold and longitudinal compression of the heat softened plastic to obtain wall thickness greater than the original extruded pipe section. The apparatus includes compressor members to shorten the heat softened extruded pipe section, a rigid external die or mold to shape the exterior, expanding mandrels made of mechanically rigid materials to accurately form the interior, and structure to accurately position the mandrels with respect to the outer mold to obtain accurate wall thickness.

4 Claims, 12 Drawing Figures

CLOSED POSITION

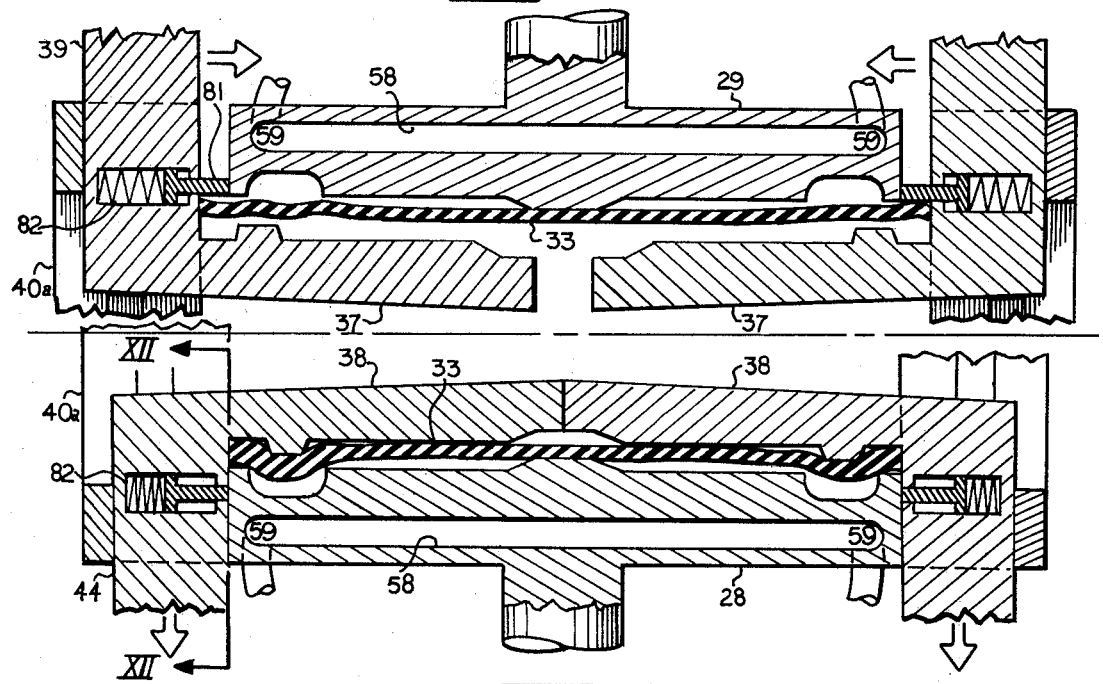
Fig. 10
Fig. 11
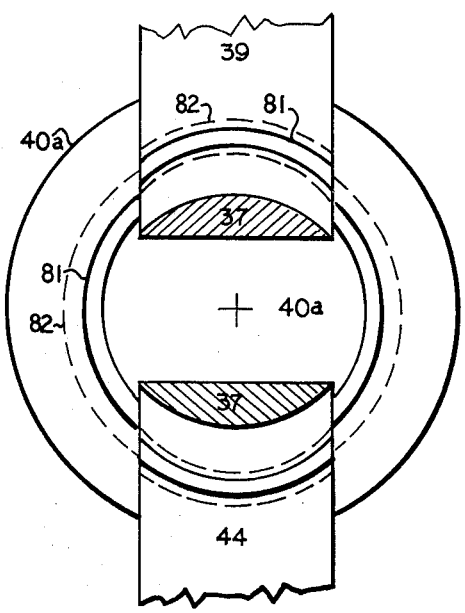
Fig. 12

EXTRUDED PIPE COUPLING AND METHOD AND APPARATUS FOR FORMING

The invention provides an improved extruded thermo plastic coupling for plastic pipe formed from a short section of the pipe size being joined or other extruded stock and characterized by wall thicknesses greater than the original pipe stock and the absence of machining in forming the internal grooves that receive the rubber sealing rings. The method of obtaining this coupling is to upset the extruded pipe section over nearly all its length and accurately expanding it in a mold. The apparatus acts upon heat softened thermo plastic section to expand it by means of an internal expanding mandrel, and to thicken the walls by an endwise compression.

BACKGROUND OF INVENTION

It has been known in the plastic pipe industry for several decades that pipe couplings made by injection molding are inherently weaker than couplings made from extruded material. Further, accelerated life tests and experience with old pipe lines shows that these couplings have a life substantially less than that of extruded pipe which they join together. Part of the problem is due to the strength of the plastic materials. Plastic formulations for injection moldings are inherently weaker than the formulations that can be extruded. For example, polyvinyl chloride (PVC) that is extruded can easily have a design strength rating of 2,000 psi. However, to provide the necessary plasticity and flow characteristics for injection molding, it is difficult to use a PVC formulation that exceeds a design strength 1600 psi (design stress) for conventional injection molding machines.

Another part of the problem has to do with the injection molding process. The cavity of the mold is usually fed by a side inlet or gate, and the material flows around the inner core of the mold on each side of the gate. The liquid plastic being injected into the mold joins together approximately opposite the gate and more or less welds together along a line known as the weld line. This weld line can be a line of weakness where injection molded couplings fail upon being subjected to high internal pressures caused by the fluids in the pipe line. The various conditions of injection molding must be critically met in order to obtain a good weld line.

As a result, couplings have been largely replaced by bells or enlarged sockets formed on one end of each length of plastic pipe. A typical installation of a pipe line involves inserting the spigot or plain end of another section of pipe into an adjoining bell and the joint is sealed by a ring of rubber or rubber-like material held in an internal groove in the bell. The bells may be formed by properly expanding a pipe and thus the inherent strength of the extruded material and the extrusion process is preserved.

However, these enlarged bells give rise to difficulties in manufacturing, storing and shipping plastic pipe. In stacking the pipe, each adjoining length has to be reversed, and each layer has to alternate plain ends and bell ends. The stacks are thus longer than the pipe sections and the protruding bells receive much damage in handling and in transportation. Furthermore, each length of extruded pipe has to be subjected to the belling process which adds substantially to the cost. For these and other reasons the plastic pipe industry has long sought a satisfactory and economical coupling.

Various attempts have been made to provide extruded couplings. Oversize extruded pipe sections have been internally machined to form the seal grooves and tapers, but these have proved to be expensive. Also, oversize extruded pipe sections have been internally expanded to create seal grooves in each end, but because of thinning at the grooves, the material had to be grossly oversize to start with, resulting in unnecessary material and cost.

SUMMARY OF THE INVENTION

We have discovered that an inexpensive and durable coupling can be made from a short section of the same size and stock of the extruded pipe sections being joined, or made from other extruded stock. We have devised a compression or shortening step for thickening the walls after the section is heated to a softening temperature. Furthermore, we have designed apparatus that will form the internal groove in each end of the coupling and in addition provide the tapered inside diameter that limits the penetration of pipes on each end of the coupling. Our finished coupling may have the same appearance and similar dimensions of an injection molded coupling, but will have the superior strength of the extrusion process and formulations.

We are aware that bells with thickened walls have been formed on pipe, one of which is described in U.S. Pat. No. 3,553,780 issued Jan. 12, 1971 to Karl Kuhlemann. In that process a pipe having a heat softened end is shoved endwise into a mold having a cavity that results in thickened sidewalls. We are also aware that swaging has been mentioned for thickening walls, as in Sands et al, U.S. Pat. No. 3,484,900 issued Dec. 23, 1969. We do not use these prior art concepts, and instead we have provided our novel process and apparatus to achieve a new type of coupling. We are able to form the entire coupling in a single operation comprised of several steps. We are performing these steps simultaneously to both ends of a short section of stock to form a fitting or coupling. This coupling or fitting is an independent entity to itself. We are not applying a process to a standard length of pipe to increase the flexibility of its use or ease of installation.

Plastic pipe has been expanded by the use of inflated bags and by expanding rubber mandrels. We have found that these do not give a uniform wall thickness, resulting in failure at the thin area. Furthermore, we have found that these processes do not give the mechanical precision of shape, especially in the internal grooves. We have devised an expanding mandrel of mechanically rigid parts that results in great precision of finish of the interior of the coupling. Further, by accurately positioning the mandrel with respect to the exterior of the mold, the wall thickness in cross section is uniform and precisely controlled.

Various objects, advantages and features of the invention will be apparent in the following description and claims considered together with the accompanying drawings forming an integral part of this specification and in which:

FIG. 10 is a partial elevation view of a modified form of the invention in vertical section taken through the upper mold member and showing the projecting ends of a softened section of plastic pipe radially confined just prior to endwise compression.

FIG. 11 is a partial elevation view of the modified form of FIG. 10, but showing the lower mold section just after endwise compression of the softened pipe, and partial expansion of the lower mandrel members, and FIG. 12 is a sectional view along the line XII—XII of FIG. 10, showing the arcuate segments that prevent radial expansion of the protruding pipe ends of FIG. 11.

Figure 9:
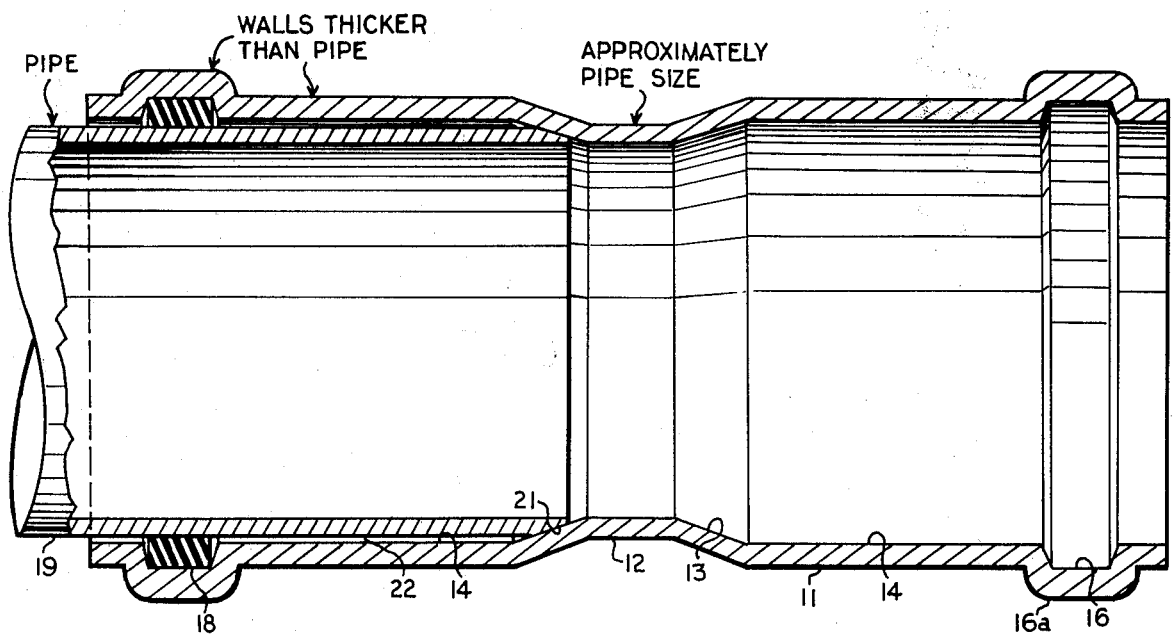
FIG. 9 is an elevation view in full section of a coupling formed in accordance with the invention and showing a length of pipe inserted in one end.

Referring to FIG. 9 there is illustrated a pipe coupling 11 having a restricted center portion 12, tapered sections 13 leading therefrom, and at the outer end of the tapered sections are generally cylindrical sections 14 in which are formed internal seal grooves 16.

Inserted in the coupling of FIG. 9 is a standard plastic pipe 19 which has an externally tapered or chamfered end 21. Disposed between the cylindrical section 14 of the coupling and the pipe 19 is an open space 22. This space allows for axial adjustment or angularity between the coupling 11 and the pipe 19. Since each end of the coupling allows for 6° of movement or angularity, the entire coupling can accommodate a bend of 12° in the pipeline. This contrasts with about 6° only, which is the accommodation or permitted angularity between the belled end of one pipe section and the inserted end of the adjoining pipe section in present commercial use.

It has also been known in the industry that when a pipe section is subjected to high pressure because of the fluids being transmitted, this causes the pipe to elastically expand in a radial direction, and this radial expansion causes the overall pipe length to shorten and thus pulling the tapered end 21 away from the tapered section 13 of the coupling. This assists in accommodating angular movement. Fluid inside the pipe will move into the space 22 between the pipe and the coupling until it is stopped by the rubber seal 18 which then deforms to make a very tight seal between the pipe and the coupling.

Referring still to FIG. 9, the restricted center portion 12 of the coupling is approximately the same size as the pipe stock from which it was made, which stock can be, but is not restricted to, the same size and wall thickness and diameter of pipe 19, for example. The other portions of the coupling have an increased wall thickness to accommodate the added stresses because of the increases in diameter of these parts. Accordingly, the forming dies take the material of the extruded pipe section and form it accurately as to wall thickness. In the outer bulge or ring around the seal groove 16, which bulge can be designated as 16a, the material is thicker than the other portions because of the fact that the diameter is greater at this seal groove than in the other portions of the coupling.

Figure 1:
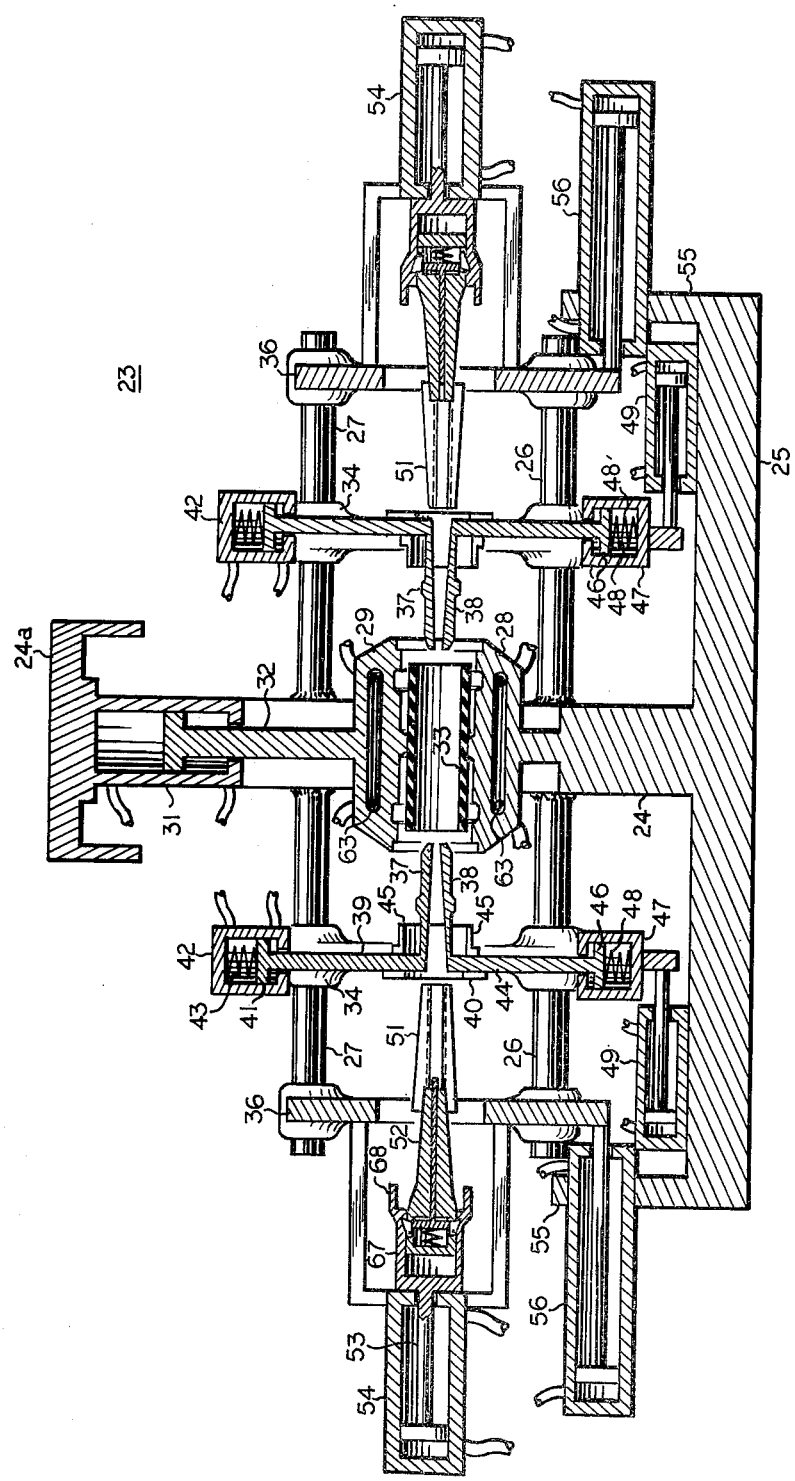
FIG. 1 is an elevation view in full section of a forming machine showing an extruded length of plastic pipe disposed within closed jaws of an outer mold and showing mandrel portions axially aligned with the pipe so as to accurately form the interior of the extruded piece of plastic.
Figure 2:
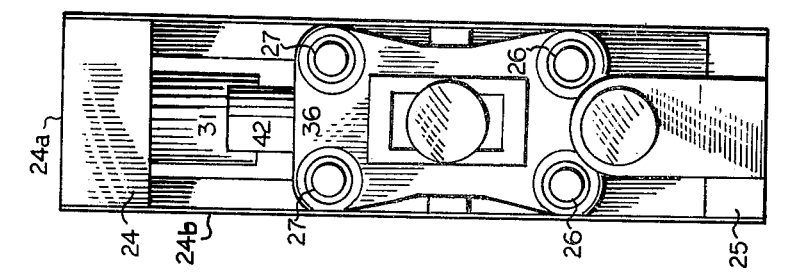
FIG. 2 is an end view of the apparatus of FIG. 1.

Referring now to FIGS. 1 and 2, the machine may be referred to generally by the reference numeral 23 and has a base 25 on which is centrally disposed a frame block 24 upon which are secured a lower pair of horizontal guide rods 26 and an upper pair of horizontal guide rods 27. The frame block 24 is in the shape of a hollowed rectangle having a top 24a and vertical sides 24b. Disposed within the lower part of the hollow rectangle 24 is a stationary lower mold section 28 and a movable upper mold section 29. This upper mold section 29 is vertically movable by a stationary cylinder 31 and a piston rod 32. Disposed between closed mold members is a heat softened section of extruded plastic pipe 33 which is longer than the ultimate length of the coupling. These mold sections 28 and 29 form a pull-apart mold which is opened to remove a finished coupling and receive a new pipe section, and which is closed to form the coupling.

Referring still to FIGS. 1 and 2 there are slidingly mounted on the guide rods 26 and 27 a pair of compressor spiders 34 adjacent to the pull-apart mold 28–29 and outboard of these compressors 34 are mandrel carriers 36, also slidingly mounted on the guide rods 26 and 27. Supported on the compressors 34 are inwardly projecting mandrel portions, an upper portion 37 and a lower portion 38. The upper portion 37 is mounted on a vertically movable slide 39 which is actuated by a piston 41 disposed inside of a cylinder 42 which contains a compression spring 43 to normally urge the mandrel member 37 downwardly. The lower mandrel portion 38 is mounted on a vertically movable slide 44 which is actuated by a piston 46 disposed in a cylinder 47 in which is disposed also a compression spring 48 to urge the mandrel portion 38 upwardly. The entire spiders 34 are moved horizontally toward and away from the mold 28–29 by piston-cylinder motors 49 secured to the base 25. The compression spiders 34 have a horizontal member (not shown in FIGS. 1 and 2) that supports a central hub 40 in which the mandrel slides 39 and 44 are guided. This hub 40 also carries on the side toward the pull-apart mold 28–29 a compression ring 45 which is free to float horizontally with respect to the hub so that each can be forced against opposite ends of the heated plastic pipe 33 to compress it in the mold.

The mandrel carrier 36 have projecting towards the pull-apart mold 28–29 additional mandrel portions which include the side mandrel members 51. Axially aligned with each side mandrel member 51 is a double tapered wedge 52 driven by a piston 53 in a cylinder 54. Each mandrel carrier 36 is moved horizontally back and forth by a piston-cylinder motor 56 each supported by a ring 55 positioned on each end of the base 25. When the upper and lower mandrel members 37 and 38 are moved apart, the mandrel carriers 36 move toward their respective compressor spiders 34 to insert the side mandrel sections 51 between these upper and lower sections 38 and 37 and thereafter the piston-cylinder motor 53–54 is actuated to drive the double tapered wedge 52 into this assembly of mandrel parts and lock them all together.

Figure 4:
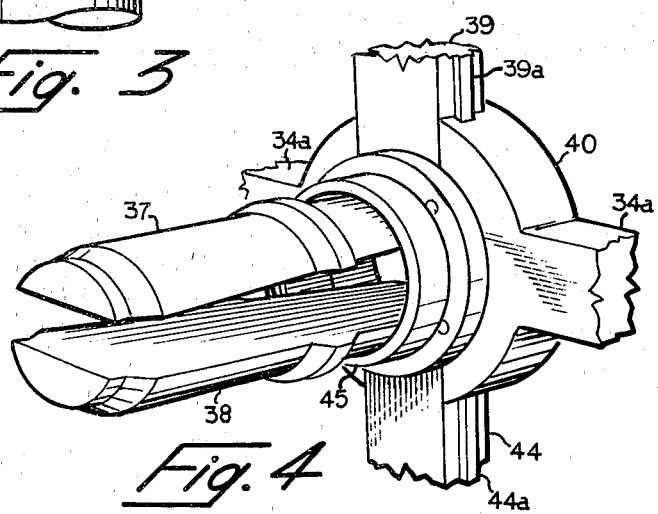
FIG. 4 is a three-dimensional view of the upper and lower mandrel sections and the structure supporting them.
Figure 5:
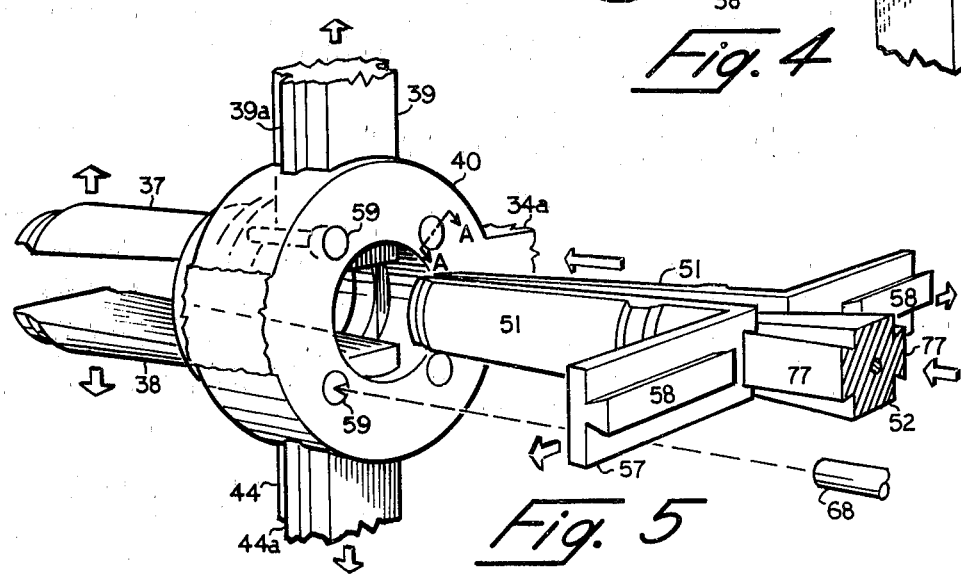
FIG. 5 is a three-dimensional view of the mandrel portions of FIG. 4, but in addition, shows the side mandrel portions and the driving wedge which accurately positions all mandrel portions.

Referring now to FIGS. 4 and 5 there is illustrated the construction of the mandrel. There it will be noted that the hub 40 is supported by portions 34a of the compression spider 34. There it will also be noted that the slide for the upper mandrel portion 37 has a key 39a which rides in a corresponding slot in the hub 40. Similarly, the slide 44 for the lower mandrel portion 38 has a key 44a which slides in a corresponding keyway.

Referring particularly to FIG. 5, it will be noted that the two side mandrel portions 51 are each integrally connected to a horizontal slide 57, each having a dovetail 58 which slides in a corresponding dovetailed groove in the mandrel spider 36 of FIG. 1. The side mandrels 57 are mechanically connected to the wedge 52 by dovetails 77 on the wedge sliding within dove grooves in the mandrels 51. The double tapered wedge drives the mandrels 51 apart when moving into the mold and pulls them together when moving out of the mold.

The structure for supporting the compression ring 45 is also illustrated in FIG. 5, and there it will be noted that four cap screws 59 reciprocate longitudinally in the hub 40 and have their far ends threaded into the compression ring 45. In FIG. 5 there is designated the section A—A through one of these cap screws 59, and this is shown in more detail in the upper right-hand part of FIG. 3. Inasmuch as the cap screws 59 are not on a center section through the hub 40, this section A—A is rotated from its actual position in FIG. 3. There it will be noted that the hub 40 has a counter bore 61 in which is disposed a compression spring 62 which normally urges the cap screw 59 to the right. Since the cap screw 59 is threaded into the compression ring 45, the compression springs 62 normally bias the compression ring 45 to the right, as viewed in the right-hand part of FIG. 3.

Figure 3:
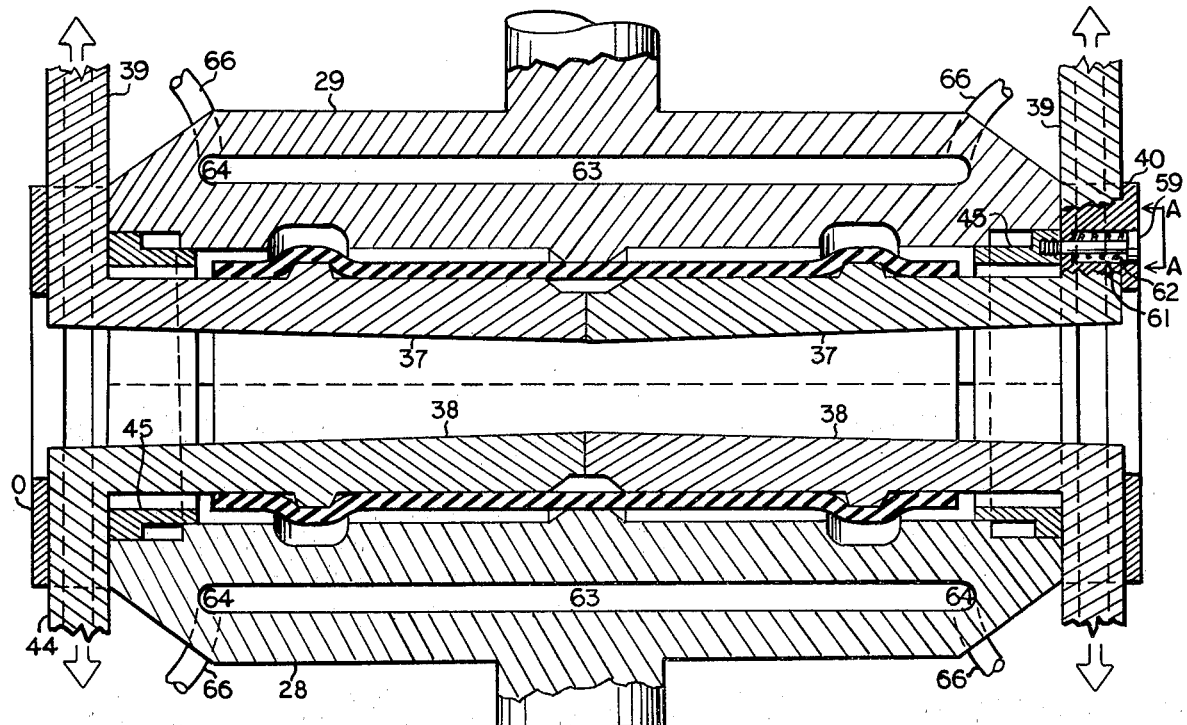
FIG. 3 is an enlarged elevation view in full cross section of the central part of the machine of FIG. 1 after the compressor spiders have been forced against the ends of the pull-apart mold.

Referring now to FIG. 3, it will be noted that the mold sections 28 and 29 have fluid passages 63 through them, which are connected at each end to manifolds 64. Pipes 66 connect to each manifold so that hot liquids may be passed through the molds 28 and 29 during the forming step when the plastic must be kept hot and cold liquids may be passed through the conduits to cool the molds when it is desired to set up the finished coupling.

Also, as illustrated in FIG. 3 are the positions of the upper and lower mandrel sections 37 and 38 when they are fully inserted inside of the mold 28–29, but before they are fully expanded. This partial expansion takes place when the mandrel slides 39 and 44 are moved in the direction of their respective arrows, and it will be noted that in the area of the groove the plastic pipe is already partly deformed. A slight additional expansion of the upper and lower mandrel sections 37 and 38 is sufficient to permit the forward end of the side mandrel portions 51 to be inserted between them and additional insertion of these tapered side mandrel sections 51 causes the upper and lower mandrel sections 37 and 38 to expand even more than shown in FIG. 3.

Figure 6:
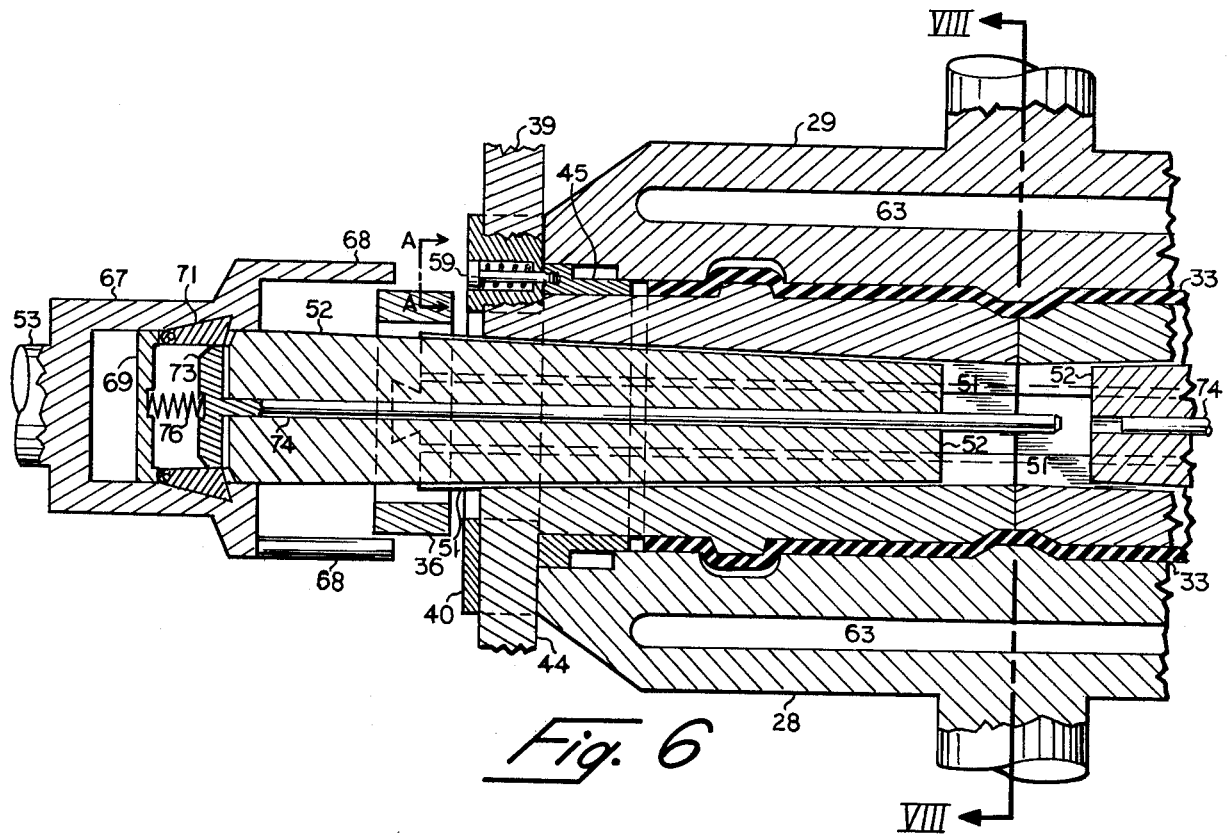
FIG. 6 is an elevation view in full section similar to FIG. 3, but showing in addition the parts of the machine of FIG. 1 to drive the wedge between the mandrel portions and to drive the compression rings between the mandrel and outer mold sections to thicken up the walls of the plastic coupling.
Figure 7:
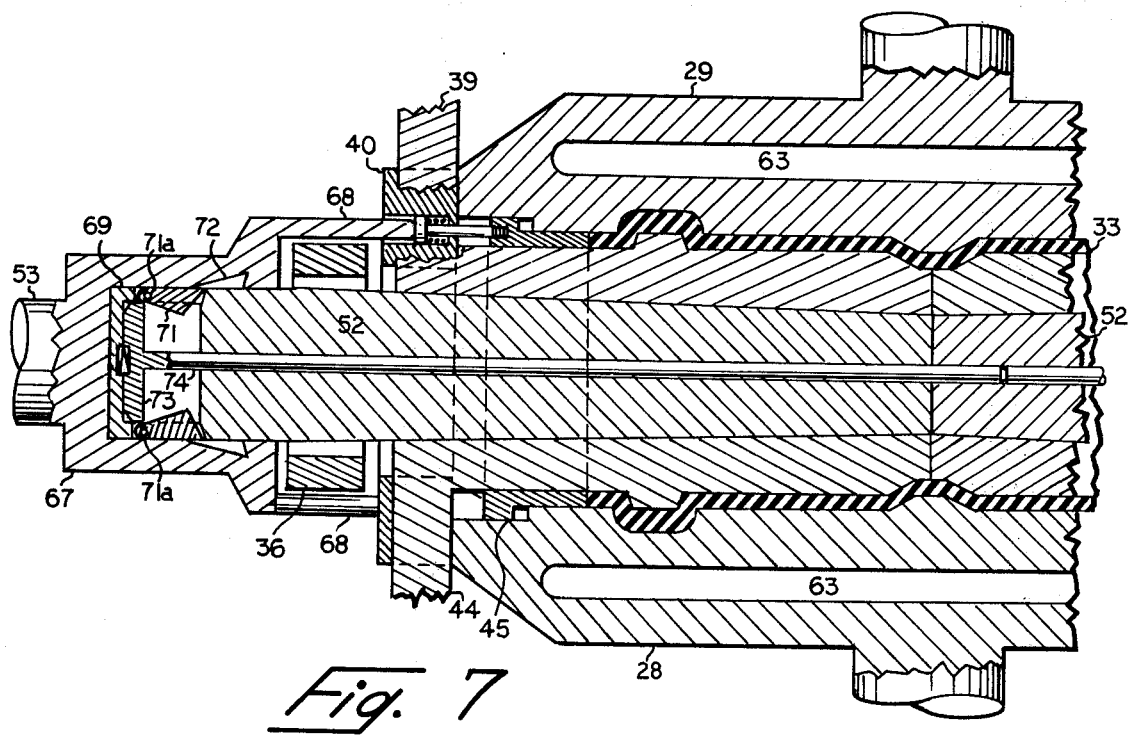
FIG. 7 is a view of a portion of FIG. 6 after the driving wedge has accurately positioned the mandrel sections, and after the compression rings have pressed against the ends of the softened plastic pipe to compress them to fully expand into the mold cavity formed between the pull-apart mold and the mandrel.

Referring to FIG. 1, it will be noted that the piston rod 53 at the left (and right) end in that figure are connected to a bell shaped housing 67 and at the outer edges of the bell there are disposed four pins 68 which act as the driving devices for moving the compression rings 45. Referring now to FIG. 5, it will be noted that one of the driving pins 68 is shown in that view and its alignment with one of the cap screws 59 is shown by a broken line. Referring now to FIGS. 6 and 7, the pins 68 are also illustrated and again it will be appreciated with respect to the upper parts of FIGS. 6 and 7 that the placement of the pins 59 are rotated in both of these figures. This is indicated by the reference to the section A—A as taken in FIG. 5. The pins 68 drive around or through the mandrel spider 36 and through the hub 40 of the compression spider 34. In FIG. 6 the pins 68 have not yet contacted the cap screws 59, and in FIG. 7 the contact has been made, the compression springs under the cap screws 59 are compressed and the compression sleeve 45 has compressed the pipe 33 endwise so that it completely fills the cavity between the mandrel and the outer pull-apart mold 28–29.

Referring again to FIGS. 6 and 7, there is illustrated the mechanism whereby the single piston-cylinder motor 53–54 actuates both the double tapered wedge 52 and the driving pins 68 that move the compression ring 45. Formed on the left end of the double tapered wedge 52 is a cup shaped member 69 which has pivoted thereon two or more pawls 71. When the double tapered wedge 52 is to the right, as shown in FIG. 6, these pawls 71 fit in recesses 72 in the bell 67 and are held in these recesses by a round head 73 mounted on the end of a stem 74 which passes through the entire length of the double tapered pin 52 and projects from the right-hand end thereof. A compression spring 76 urges this round head 73 to the right. Rod 74 acts as a feeler.

The operation of this wedge driving mechanism illustrated in FIGS. 6 and 7 is as follows. As shown in FIG. 6, the piston rod 53 drives the bell 67 to the right and the inclined surfaces on the pawls 71 act as the driving medium to force the double tapered wedge 52 to the right. When the right-hand end of the rod 74 strikes a mating rod 74 in the other double tapered wedge 52, the rod 74 and consequently its round head 73 moves to the left, compressing the spring 76. When the round head 73 moves to the region of the hinge on the pawls 71, then the pawls are free to rotate toward the center of the cup 69 and thereupon the engagement with the bell 67 is lost. Movement of the double tapered pin 52 to the right thereupon ceases, but the bell 67 continues to the right until the pins 68 strike the cap screws 59 and these, in turn, drive the compression ring 45 against the plastic extrusion 33 to compress it against the mold surfaces. This compression of the extruded pipe section is shown in FIG. 7.

When the extruded pipe has been fully compressed into its mold and cooled by passing cool liquid through the cooling passages 63 of the pull-apart mold 28–29, the double tapered wedge 52 is moved to the left in FIG. 6. This occurs by virtue of the piston rod 53 pulling the bell 67 to the left, while the double tapered wedge 52 remains solidly in position. When the pawl notches 72 lie opposite the pawls 71, helical springs (not shown) around the hinge pin 71a of each pawl rotate the pawls 71 outwardly to engage these recesses 72. This is the condition shown in FIG. 6. Thereafter, further movement of the bell 67 to the left causes the double tapered pin 52 to move to the left, and as it moves to the left the compression spring 76 forces the round headed pin 73 to the right to the point where it again supports the pawls as shown in FIG. 6.

Figure 8:
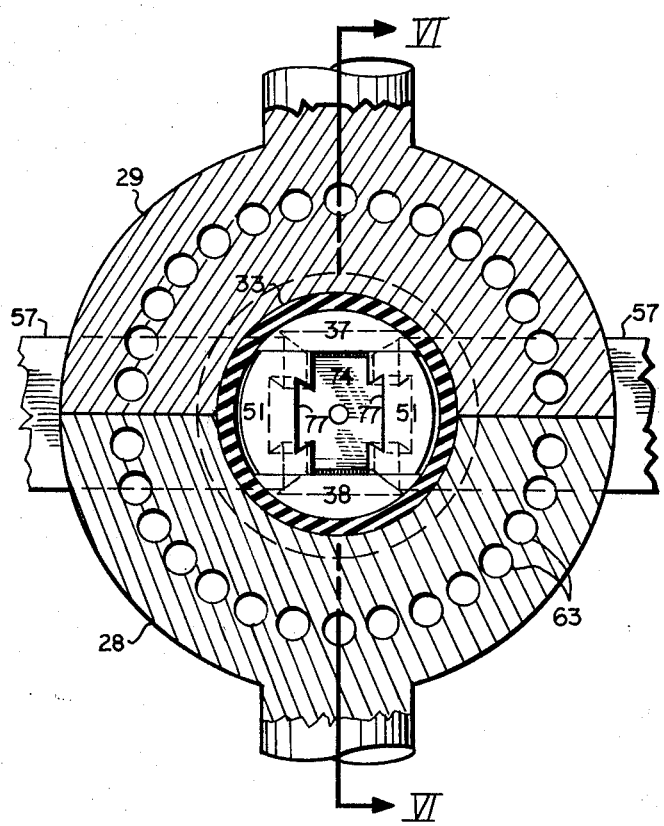
FIG. 8 is a sectional view along the line VIII—VIII of FIG. 6.

Referring now to FIG. 8, this is an end view of the mandrel sections and the double tapered wedge and shows dovetails 77 on each side of the double tapered wedge which fit into dove slots in each of the side mandrel members 51. The upper and lower mandrel members 37 and 38 are also shown in this view. Also shown in this view are the heating and cooling passages 63 through the pull-apart mold sections 28 and 29. The wedge 52 is a superior mechanism for driving apart the side mandrels 51. If motors were used on the horizontal slides 57 for these side mandrels 51, there would be bending at the angle between them, especially during the compression by the ring 45. The wedge 52 is positive in its action and there is no deflection of the mandrel parts, even during the most intense compression of the plastic pipe section.

OPERATION OF THE APPARATUS OF FIGS. 1 THROUGH 8

Referring to FIG. 1, the cylinder 31 is energized to lift the piston rod 32 upwardly so that a piece of plastic pipe 33 may be inserted between the upper mold 29 and the lower mold 28. The plastic pipe 33 is preferably preheated to a soft condition and hot liquid is passed through the passages 63 in the two mold portions to keep the plastic softened. The mold 28–29 is then closed as shown in FIG. 1. Thereafter, motors 49 are energized to move the two compression spiders 34 toward the mold halves 28 and 29. This causes the upper and lower mandrel portions 37 and 38 to be inserted inside of the extruded pipe section 33 until these mandrel portions touch each other. Thereupon the respective cylinder-piston motors 41–43 are operated to fit the upper mandrel sections 37 and at the same time the lower piston-cylinder motors 46–47 are operated to pull the lower mandrel section 38 downwardly. This spaces these mandrel sections far enough apart so that the side mandrel sections 51 supported on the next spider 36 can pass between them. This movement is accomplished by actuating the motor 56 to drive both mandrel spiders 36 toward the mold halves 28–29. All four mandrel sections of each half are now inside of the softened plastic tube 33 and they are expanded to their fullest extent by driving the double tapered wedges 52 through these two assemblies. This is done by actuating the piston-cylinder motors 53–54 on each end of the machine of FIG. 1, which thereupon drives the double tapered wedges into the assembly of outer mandrel parts and solidly positions them with respect to the outer mold members 28–29.

Referring now to FIGS. 6 and 7, the last stages of driving the double tapered wedges 52 into the mandrel assembly is illustrated in FIG. 6. When the two rods 74 disposed in the center of each wedge contact each other, they are driven outwardly by this contact as the wedges 52 move together. This causes their respective round heads 73 to move outwardly or, as seen in FIG. 6, to the left. The round head 73 will move to the left, as shown in FIG. 7, when the double tapered wedges 52 are solidly abutting each other and have finished their wedging action. Continued movement of the supporting bell 67 toward the molds 28–29 forces the pawls 71 inwardly, as shown in FIG. 7. Thereupon, continued movement of the bell 67 causes their integral pins 68 to strike the cap screws 59, which, in turn, drive the compressor ring 45 against the ends of the plastic material in the mold, as shown best in FIG. 7. This action of the compressor rings causes the entire plastic pipe to be expanded tightly against the inner mandrel and the outer mold sections, causing it to be exactly and precisely formed. After the forming action is completed, cold liquid is passed through the passages 63 in the pull-apart mold sections 28–29 and when the plastic material is cooled to the point of setting up, then the mandrel sections are pulled out of the plastic pipe and the pull-apart mold 28–29 is opened and the finished coupling is manually removed.

The disassembly or removal of the interior mandrel parts proceeds by collapsing the mandrel portions so that there is no tendency to disturb the seal groove in the coupling. The first step in the collapsing action is to pull outwardly the double tapered wedges 52 and this is best explained with respect to FIG. 7 and FIG. 1. As the bell 67 moves to the left in FIG. 7 because of piston rod 53 (FIG. 1), the recesses 72 are disposed opposite the pawls 71 and the pawls thereupon are induced by spring action to fit into these recesses 72 and thereupon the double tapered wedges 52 are pulled outwardly by the pawls contacting these recesses. By virtue of the fact that the side mandrel sections 51 are dovetailed to the double tapered wedges 52, these mandrel sections 51 are pulled inwardly as the wedges are retracted by motors 53–54. This clears the lands on these side mandrel sections 51 from the seal groove of the coupling. Thereafter, movement of the mandrel spiders 36 outwardly will pull these side mandrel portions 51 clear of the inner mandrel sections 37 and 38. Thereupon, springs 43 in the driving pistons 41 and 46 of the upper and lower mandrel sections 37 and 38 will move these mandrel sections together until their lands clear the groove, whereupon they too may be retracted outwardly by operation of the motors 49.

MODIFICATION OF FIGS. 10, 11 AND 12

Illustrated in FIGS. 10, 11 and 12 is a modified form of the invention wherein a section of extruded pipe is utilized that is longer than the mold 28–29. This extra long piece of material is shortened, thereby increasing its wall thickness, by the action of the compressor spiders 34 before the internal mandrel is expanded. During the compression phase a sectioned control ring 81 is in contact with the mold 28–29 to insure that all of the compressed material is confined against radial expansion so that it will all be held within the mold 28–29 cavity.

Referring to FIG. 10, the upper slide 39 for the upper mandrel section 37 has disposed in it the upper section of the control ring 81. Similarly, the lower slide 44 for the lower mandrel section 38 carries the lower sector of the control ring 81. The side sections of control ring or sleeve 81 are affixed to the face of a compression spider hub 40a during the insertion of the upper and lower mandrel sections 37 and 38 into the heated pipe 33, which is held in the closed mold 28–29, the face of the compressor spider hub 40a as well as the faces of the upper mandrel slide 39 and lower mandrel slide 44 contact the protruding ends of the heated pipe (FIG. 10) before the right and left side of the upper and lower mandrels 37 and 38 abutt against each other. Continued movement of the compression spiders 34 toward the mold 28–29 shortens the length of the pipe increasing its wall thickness as shown in FIG. 11. Referring again to FIG. 10, it will be noted that control sleeve 81 has come in contact with the end of the mold 28, and that a compression spring 82 is disposed behind each of the upper and lower circular sectors 81 so that they may be pushed inwardly to recess flush with the face of the respective holding piece as shown in FIG. 11 as the pipe is shortened. In this manner the length of pipe being shortened is confined with the mold 28–29.

The next step in the forming process is that the upper 37 and lower 38 mandrel sections move away from each other in the vertical plane extending the pipe toward the mold 28–29. FIG. 12 shows the configuration of the control sleeve 81 during this step. In FIG. 11 it can be noted that once the pipe has been shortened and the right and left sides of the upper 37 and lower 38 mandrel sections are abutted that the upper and lower sections of control sleeve 81, which are now recessed, are free to slide along the end face of mold 28–29 as the mandrel is expanded.

Next, the side mandrel sections (not shown) are introduced through the hole in hub 40a and between the upper and lower mandrel sections and then the tapered wedge is put into position completing the expansion of the mandrel and locking all of the mandrel pieces in position, similar to the wedging action described in connection with FIG. 1. The sectors of ring 81 carried by the hub 40a have L shaped based and are held to the hub by sliding pins not shown.

After the pipe coupling is formed and the molds 28–29 cooled, the mandrels are disassembled and the finished coupling removed, as with the structure of FIG. 1.

It will be realized that the structure of FIGS. 1 through 9, as well as that of FIGS. 10 through 12, can be used to form couplings from the same size of extruded pipe stock as the pipe to be joined by the couplings. Ordinarily, standard pipe stock will be cheaper to use than specially extruded stock. However, the invention is applicable also to stock of lesser size than the pipe being joined and is applicable to greater size pipe sections as well. In the case of the greater size of pipe, or pipe stock of greater wall thickness than the finished coupling, the pipe section will be reduced in wall thickness at certain areas of the coupling or in all areas, depending on the stock. The compression rings of the apparatus in this case act to shape up the ends of the coupling and exert a uniform compression. Also, the invention results in a coupling that has exactly the correct wall thickness in all areas, no more nor no less. This is extremely important in view of the present scarcity of plastic materials and high price. The invention can be used on thermo plastic materials of all kinds and pvc and abs are two commonly used plastics in the pipe industry.

While the invention has been described with reference to presently preferred embodiments of the invention, as required by the Patent Office Rules, it is not limited to these embodiments and extends to all variations and modifications that fall within the true spirit and scope of the invention.

We claim:

1. The method of simultaneously forming a pair of back-to-back bells from a single piece of extruded pipe stock to thereby form a coupling, comprising:
    a. heating to plasticity an entire section of extruded thermoplastic pipe stock;
    b. enclosing the exterior of the entire pipe section in a mold having the shape of the finished coupling bells;
    c. simultaneously expanding two end portions of said stock by separating split mandrel elements inserted in both ends of said stock; and
    d. simultaneously thickening portions of said stock adjacent two ends thereof by axially compressing the entire section of pipe stock while confining it between said mold and said mandrel elements; thereby forming a coupling having a pair of bells opening outwardly on each end.

2. The method of claim 1 wherein the longitudinal compressing is performed before the pipe section is expanded against the outer mold.

3. The method of claim 1 wherein the longitudinal compressing is performed after the pipe section is expanded against the outer mold.

4. A method for producing a plastic pipe coupling from relatively incompressible extruded thermoplastic pipe or tube stock wherein all the extruded thermoplastic pipe or tube stock is reshaped and its mass redistributed to simultaneously form two back-to-back socket portions joined near the middle of the coupling in a constriction of the inner and outer diameters with each said socket portion containing an annular groove with inside diameter greater than the inside diameter of the socket portions and outside diameter greater than the outside diameter of the socket portions, in such a manner that the wall thickness of any cross section along its length is maintained at a fixed ratio to the outside diameter of that cross section comprised of:
    a. heating to plasticity an entire piece of extruded thermoplastic stock;
    b. enclosing the entire piece of extruded thermoplastic stock in a mold;
    c. simultaneously expanding two end portions of said stock by separating split mandrel elements inserted in both ends of said stock; and
    d. simultaneously thickening said stock adjacent two ends thereof by axially compressing the entire section of pipe stock while confining it between said mold and said mandrel elements; thereby forming a coupling having a pair of bells opening outwardly on each end.

\* \* \* \* \*